(12) United States Patent
Heinstein et al.

(10) Patent No.: US 7,634,905 B2
(45) Date of Patent: Dec. 22, 2009

(54) METHOD FOR OPERATING AN INTERNAL COMBUSTION ENGINE AND DEVICE FOR IMPLEMENTING THE METHOD

(75) Inventors: Axel Heinstein, Wimsheim (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 887 days.

(21) Appl. No.: 11/042,455

(22) Filed: Jan. 25, 2005

(65) Prior Publication Data

US 2005/0210867 A1    Sep. 29, 2005

(30) Foreign Application Priority Data

Mar. 27, 2004    (DE) .................. 10 2004 015 131

(51) Int. Cl.
*F01N 3/00* (2006.01)
(52) U.S. Cl. ................. 60/277; 60/274; 60/276; 60/287; 60/288
(58) Field of Classification Search ............ 60/274, 60/276, 277, 287, 288, 324; 137/2, 527.6, 137/551
See application file for complete search history.

(56) References Cited

U.S. PATENT DOCUMENTS

| | | | | |
|---|---|---|---|---|
| 5,709,241 A * | 1/1998 | Iwata | ................... | 137/527.6 |
| 5,761,902 A * | 6/1998 | Usami et al. | ............ | 60/288 |
| 6,182,445 B1 * | 2/2001 | Yamazaki et al. | ........ | 60/277 |
| 6,321,533 B1 * | 11/2001 | Watanabe et al. | ....... | 60/324 |
| 6,463,949 B2 * | 10/2002 | Ferguson et al. | ........ | 137/2 |
| 6,477,830 B2 * | 11/2002 | Takakura et al. | ........ | 60/277 |
| 7,062,968 B2 * | 6/2006 | Ueno et al. | ........... | 73/335.05 |

FOREIGN PATENT DOCUMENTS

DE    103 00 593    7/2004

* cited by examiner

*Primary Examiner*—Tu M Nguyen
(74) *Attorney, Agent, or Firm*—Kenyon & Kenyon LLP

(57) ABSTRACT

A method for operating an internal combustion engine and a device for implementing the method, in which a diagnosis is performed of an adjusting device situated in the exhaust duct of the internal combustion engine, which distributes the exhaust gas between a first and at least one second exhaust gas path. A transit time from a change of a characteristic quantity of the exhaust gas in front of the adjusting device until the appearance behind the adjusting device detected by a sensor is compared to a specified transit time threshold value. The transit time threshold value is specified as a function of a setpoint position of the adjusting device. In the event of a deviation from or exceedance of the threshold value, a fault signal is provided.

9 Claims, 1 Drawing Sheet

METHOD FOR OPERATING AN INTERNAL COMBUSTION ENGINE AND DEVICE FOR IMPLEMENTING THE METHOD

BACKGROUND INFORMATION

Future internal combustion engines of motor vehicles, operating, for example, on the basis of jet-directed combustion methods, have lower thermal losses due to a favorable engine efficiency factor. The dissipation power of the internal combustion engine is then often no longer sufficient for heating the passenger compartment. Diesel engines also achieve a comparatively high efficiency factor such that the thermal losses are not always sufficient particularly for heating larger vehicles. For this reason, the introduction of heat exchangers is being considered, in which the exhaust gas heats the cooling water of the internal combustion engine. Furthermore, it is possible to fall back on an air-heat exchanger as was formerly used in the known boxer engine by Volkswagen.

In many cases, the thermal energy of the exhaust gas is used to heat exhaust-gas treatment devices. Such an exhaust-gas treatment device, for example, is a catalytic converter, which on the one hand may have a certain minimum operating temperature for the catalytic function and on the other hand a certain minimum operating temperature for initiating a regeneration if it is a catalytic converter with hydrocarbon trap. Such an exhaust-gas treatment device is furthermore a particle filter, for example, which likewise must reach a minimum operating temperature for initiating the regeneration.

For guiding an exhaust gas either via the heat exchanger for implementing heating in the passenger compartment or via a bypass for heating an exhaust-gas treatment device, an adjusting device may be provided in the exhaust duct, which contains a movable valve. For reasons of emissions and safety, it may be necessary to diagnose the adjusting device.

A method and a device for operating an internal combustion engine have become known from non-prepublished German Patent Application No. DE 103 00 593, which allow for a diagnosis of an adjusting device situated in an exhaust duct without an additional sensor. The internal combustion engine contains an exhaust-gas recirculation, via which in an activated state exhaust gas is directed from the exhaust duct into an intake manifold. In at least one operating state of the internal combustion engine with an activated exhaust-gas recirculation, a first intake manifold pressure is ascertained in a first position of an element of the adjusting device and a second intake manifold pressure is ascertained in a second position of the element of the adjusting device. The functioning of the adjusting device is monitored as a function of a difference between the first and the second intake manifold pressure.

The present invention has the objective of providing a method for operating an internal combustion engine and a device for implementing the method, which allow for a simple diagnosis of an adjusting device situated in the exhaust duct of an internal combustion engine.

SUMMARY OF THE INVENTION

The present invention relates to an adjusting device situated in the exhaust duct of an internal combustion engine, which is capable of distributing the exhaust gas between a first and at least one second exhaust-gas path. According to the present invention, a transit time from a change of a characteristic quantity of the exhaust gas in front of the adjusting device until the appearance detected by a sensor behind the adjusting device is compared to a specified transit time threshold value, the transit time threshold value is established as a function of a setpoint position of the adjusting device, and in the event of a deviation from the threshold value or an exceedance of the threshold value a fault signal is provided.

The procedure according to the present invention allows for a diagnosis of the adjusting device that can be implemented in a cost-effective manner by including an already existing sensor situated behind the adjusting device. Such a sensor, for example, is a lambda sensor and/or a sensor that monitors a pollutant concentration such as for example the NOx concentration in the exhaust gas. Alternatively or additionally, an exhaust-gas temperature sensor and/or an exhaust-gas pressure sensor may be provided. In a control unit, which establishes the setpoint position of the adjusting device and which detects or specifically brings about a change of a characteristic quantity of the exhaust gas in front of the adjusting device, the transit time threshold value is specified and compared to the detected transit time. In the event of a deviation from or an exceedance of the threshold value, the provided fault signal may be displayed and/or stored in a fault storage.

One refinement provides for the change of the characteristic quantity of the exhaust gas to be specifically specified by an intervention in the operation of the internal combustion engine. The intervention in the operation of the internal combustion engine may occur for example by a change between a homogeneous and a stratified-charge operation of a direct-injecting spark-ignition engine. The switch between the at least two different operating modes can result on the basis of the normal operation of the internal combustion engine. Alternatively, the intervention may also be undertaken specifically on the basis of a diagnosis request.

Another refinement provides for the change of the characteristic quantity of the exhaust gas in front of the adjusting device to be detected by a sensor. As a function of the at least one characteristic quantity of the exhaust gas used for the diagnosis, a lambda sensor and/or a pollutant concentration sensor and/or an exhaust-gas temperature sensor and/or an exhaust-gas pressure sensor may again be provided for example. An alternative for detecting the change of the characteristic quantity of the exhaust gas in front of the adjusting device is possible by calculating the change, which can be done on the basis of known performance characteristics of the internal combustion engine. Such performance characteristics, for example, are the air signal provided by an air sensor and/or the rotational speed of the internal combustion engine and/or a fuel signal and/or a load and/or a torque.

One refinement provides for the transit time threshold value to be a function of at least one performance characteristic of the internal combustion engine. The operating state of the internal combustion engine is characterized, for example, by the already mentioned performance characteristics. An adaptation of the transit time threshold value is achieved by this measure, which can increase the reliability of the result of the diagnosis.

An advantageous refinement provides that first the transit time following a change of the characteristic quantity of the exhaust gas at a first setpoint position of the adjusting device is detected, that the detected transit time is stored as a transit time threshold value, that subsequently the transit time is detected following a change of the characteristic quantity of the exhaust gas at a second setpoint position and that the transit time detected in the second setpoint position is compared to the stored transit time threshold value. This measure achieves an adaptation of the transit time threshold value to the currently prevailing conditions.

A refinement provides for the change of the position of the adjusting device from the first to the second setpoint position to be carried out in a stationary operating state of the internal combustion engine. Starting from the stationary operating state of the internal combustion engine, for example from the idling state, the changes of the characteristic quantity of the exhaust gas can be specified on the basis of defined initial conditions.

The device according to the present invention includes the device components required for implementing the method.

DETAILED DESCRIPTION

Figure 1:
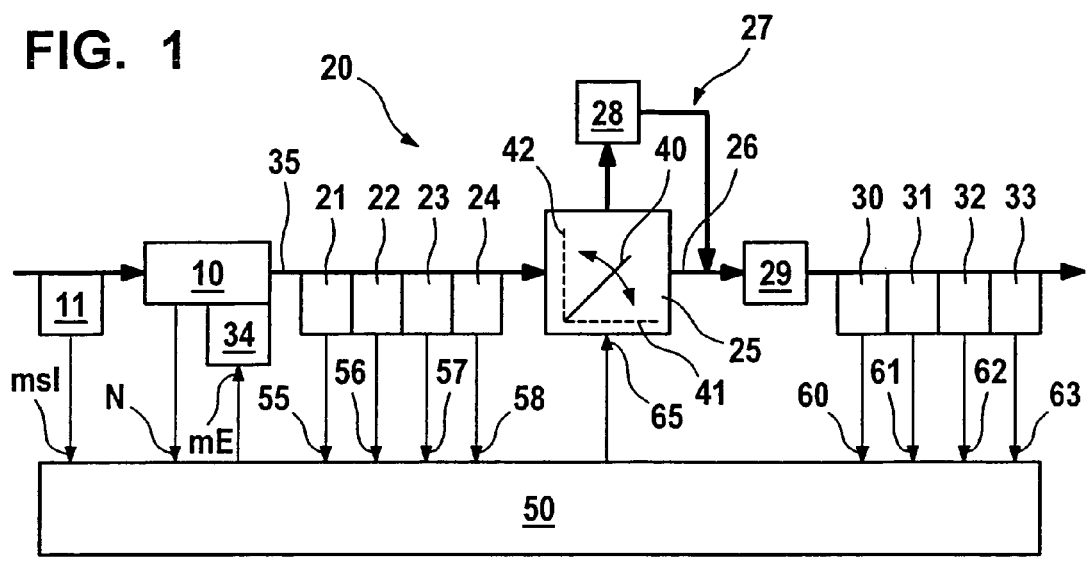
FIG. 1 shows a technical environment of an internal combustion engine, in which a method according to the present invention is executed.

FIG. 1 shows an internal combustion engine 10 that has an air sensor 11 situated in its intake region. In exhaust-gas region 20 of internal combustion engine 10, a first to fourth exhaust-gas sensor 21-24 is situated upstream of an adjusting device 25. Adjusting device 25 distributes the exhaust gas to a first and second exhaust-gas path 26, 27. A heat exchanger 28 is provided in second exhaust-gas path 27. Located downstream of adjusting device 25 are an exhaust-gas treatment device 29 as well as a fifth to eighth exhaust-gas sensor 30-33. A fuel-metering device 34 is associated with internal combustion engine 10.

Adjusting device 25 located in an exhaust duct 35 includes a valve 40. A first and a second position 41, 42 of valve 40 are shown.

The air signal msL provided by air sensor 11, the rotational speed signal N provided by internal combustion engine 10, the first to fourth exhaust-gas signal 55-58 provided by first to fourth exhaust-gas sensor 21-24 as well as the fifth to eighth exhaust-gas signal 60-63 provided by the fifth to eighth exhaust-gas sensor 30-33 are made available to a control unit 50.

Control unit 50 provides a fuel signal mE to fuel metering device 34 and a position setpoint value 65 to adjusting device 25.

Figure 2:
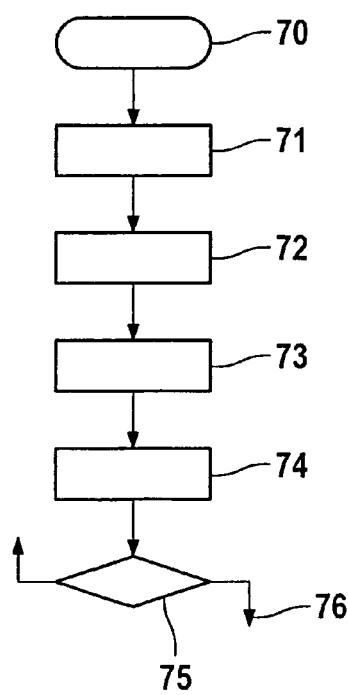
FIGS. 2 and 3 respectively show executions of a method according to the present invention.

FIG. 2 shows a first exemplary embodiment of a method sequence beginning with a start 70. In a first functional block 71, a change of the characteristic quantity of the exhaust gas is brought about in front of adjusting device 25 or a change that has occurred is detected. In a second functional block 72, position 41, 42 of valve 40 of adjusting device 25 is detected. In a first assignment 73, a transit time threshold value Lim is provided. In a third functional block 74, a transit time LZ is ascertained. In a first query 75, it is established whether transit time LZ deviates from transit time threshold value Lim. Preferably it is established whether transit time LZ is greater than the specified transit time threshold value Lim. If this is the case, first query 75 provides a fault signal 76. If this is not the case, the diagnosis is ended without fault signal 76, and, if indicated, the system branches back to start 70.

Figure 3:
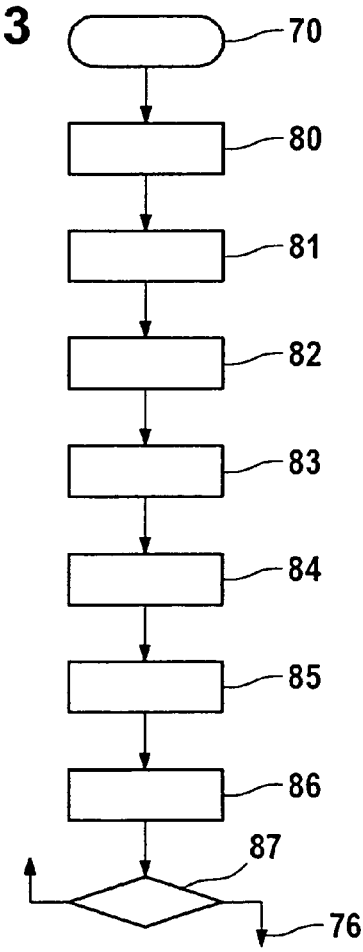

FIG. 3 shows another exemplary embodiment of a method sequence also beginning with start 70. A first position 41, 42 of valve 40 is detected in a fourth functional block 80. In a second assignment 81, a characteristic quantity of the exhaust gas is changed. In a fifth functional block 82, transit time LZ is ascertained. In a third assignment 83, the ascertained transit time LZ is compared to transit time threshold value Lim. In a sixth functional block 84, a second position 41, 42 of valve 40 is detected. In a fourth assignment 85, a characteristic quantity of the exhaust gas is changed. In a seventh functional block 86, transit time LZ is again ascertained. In the following second query 87, it is established whether transit time LZ deviates from transit time threshold value Lim. Preferably it is established whether transit time LZ is greater than transit time threshold value Lim. If this is the case, second query 87 provides fault signal 76. If this is not the case, the diagnosis is ended without fault signal 76, and, if indicated, the system branches back to start 70.

The method according to the present invention functions as follows:

Adjusting device 25 located in exhaust duct 35 of internal combustion engine 10 includes valve 40, which distributes the exhaust-gas stream occurring in exhaust duct 35 to the first and at least one second exhaust-gas path 26, 27. First exhaust gas path 26 is a simple bypass for example. The at least one second exhaust gas path 27 preferably contains a device such as a heat exchanger 28 for example. Position 41, 42 of valve 40 may be adjusted either continuously or in steps. FIG. 1 shows specifically a first and second position 41, 42 of valve 40. In addition to the shown first and second positions 41, 42, other specifically specified positions may be provided. When guided in first exhaust-gas path 26, which takes the form of a bypass for example, the exhaust gas directly reaches the likewise provided exhaust-gas treatment device 29, which may be a catalytic converter and/or a particle filter for example.

When guided through heat exchanger 28, the exhaust gas first heats heat exchanger 28 and after heat exchanger 28 returns again for example to the end of first exhaust-gas path 26. In place of a heat exchanger 28, a further or alternative exhaust-gas treatment device or additional devices may be provided which are to have the exhaust-gas stream flowing through them.

The position of valve 40 in adjusting device 25 is specified by control unit 50 using position setpoint value 65. Position setpoint value 65 is specified for example on the basis of an existing heating requirement for the passenger compartment of a motor vehicle if internal combustion engine 20 is located in a motor vehicle. Position setpoint value 65 may also be specified on the basis of an existing heating requirement for exhaust gas treatment device 28. In addition to a shown adjusting device 25, further relevant adjusting devices may of course be located in exhaust duct 35 of internal combustion engine 10.

For emission and safety reasons, a diagnosis of adjusting device 25 is provided. The diagnosis determines whether valve 40 has at least approximately arrived at the position specified by position setpoint value 65. The diagnosis is based on the fact that transit time LZ from a change of a characteristic quantity of the exhaust gas in front of adjusting device 25 until the appearance behind adjusting device 25 detected by fifth to eight exhaust-gas sensor 30-33 is compared to specified transit time threshold value Lim, that transit time threshold value Lim is specified as a function of position setpoint value 65, and that in case of a deviation from transit time setpoint value Lim or in case of an exceedance of the threshold, fault signal 76 is provided.

In the exemplary embodiment of the method according to the present invention shown in FIG. 2, transit time threshold value Lim is specified as a function of position setpoint value 65 and preferably as a function of performance characteristics of internal combustion engine 10 in first assignment 73. For example, air signal msL provided by air sensor 11 and/or rotational speed signal N provided by internal combustion engine 10 and/or fuel signal mE are suited as performance characteristics of internal combustion engine 10. Fuel signal mE corresponds to a torque to be produced by internal combustion engine 10. The torque is a measure for the load of internal combustion engine 10. Particularly air signal msL is alone already suited for specifying transit time threshold value Lim since it definitively reflects the exhaust-gas mass flow. The additional influence by the fuel metered to internal combustion engine 10 can possibly be neglected depending on the specified accuracy requirement.

In first functional block 71, a change of a characteristic quantity of the exhaust gas is either specified or detected. The air ratio lambda and/or a pollutant concentration and/or the exhaust-gas temperature and/or the exhaust-gas pressure for example are provided as characteristic quantity of the exhaust gas. Of fifth to eighth exhaust-gas sensor 30-33, at least one exhaust-gas sensor 30-33 is required for implementing the method. Exhaust-gas sensor 30-33 detects the at least one characteristic quantity, in which the change is to be detected. Control unit 50 ascertains the change from the at least one fifth to eighth exhaust gas signal 60-63 for example on the basis of an evaluation of a difference quotient or a differential quotient or by comparison to threshold values or tolerance bands. If indicated, the magnitude of the change can be detected.

First, however, a change of the characteristic quantity of the exhaust gas is either specified or detected in first functional block 71. The detection may be performed by measuring the characteristic quantity of the exhaust gas of at least one present first to fourth exhaust gas sensor 21-24. The type of the at least one existing first to fourth exhaust-gas sensor 21-24 corresponds to the type of the at least one existing fifth to eighth exhaust-gas sensor 30-33. First exhaust-gas sensor 21 is therefore a lambda sensor, second exhaust-gas sensor 22 is a pollutant concentration sensor such as for example a NOx sensor, third exhaust-gas sensor 22 is an exhaust-gas temperature sensor and fourth exhaust-gas sensor 24 is an exhaust-gas pressure sensor. If none of the first to fourth exhaust gas sensors 21-24 are provided, a change of the characteristic quantity of the exhaust gas can also be calculated from performance characteristics msL, N, mE of internal combustion engine 10.

A suitable alternative provides for control unit 50 specifically to bring about the change of the characteristic quantity of the exhaust gas. The change may be provided for example in the context of the normal operation of internal combustion engine 10. If internal combustion engine 10 takes the form of a direct-injecting spark-ignition engine, then there may be a switch between a homogeneous and a stratified-charge operation for example. Outside of the normal operation of internal combustion engine 10, a change of at least one performance characteristic of internal combustion engine 10 may also be specifically brought about for performing the diagnosis.

In second functional block 72, position 41, 42 of valve 40 is detected. Position 41, 42 is equal to position setpoint value 65 specified by control unit 50. First assignment 73 establishes transit time threshold value Lim as a function of position setpoint value 65 of valve 40. The shown first and second position 41, 42 of valve 40 as well as arbitrary intermediate positions may be taken into account in establishing transit time threshold value Lim. If only concrete positions such as, for example, the shown first and/or second position 41, 42 are to be taken into consideration, then the subsequent determination of transit time threshold value Lim is more certain and thus the diagnosis more reliable. First assignment 73 determines transit time threshold value Lim preferably by a functional relationship stored in characteristics fields, which can be ascertained by experiment on a test stand.

In third functional block 74, the elapsed transit time LZ is subsequently ascertained in control unit 50 as the difference between the occurrence of the change of the characteristic quantity in front of adjusting device 25 and the detection of the change of the characteristic quantity of the exhaust gas by at least one of the fifth to eighth exhaust gas sensors 30-33. If the ascertained transit time LZ deviates from transit time threshold value Lim or if it exceeds it, then first query 75 provides fault signal 76 which may be displayed or stored in a fault storage for example. The deviation may be the exceedance of a threshold. If no deviation or threshold exceedance is ascertained, the diagnosis is ended for example with a "good" result, and, if indicated, the system branches back to start 70.

In the exemplary embodiment shown in FIG. 3, transit time threshold value Lim is ascertained from transit time LZ detected in a preceding step. After start 70, initially the one first position 41, 42 of valve 40 corresponding to specified position setpoint value 65 is detected in fourth functional block 80. In second assignment 81, a change of the characteristic quantity of the exhaust gas in front of adjusting device 25 is either detected or preferably specifically changed. In fifth functional block 82, transit time LZ is ascertained, with which the change makes itself felt behind adjusting device 25, which is detected by at least one existing fifth to eighth exhaust gas sensor 30-33. In third assignment 83, detected transit time LZ is subsequently set equal to transit time threshold value Lim. In subsequent sixth functional block 84, the one second position 41, 42 of valve 40 is detected, which corresponds to position setpoint value 65. Subsequently in the fourth assignment 85 the change of the characteristic quantity of the exhaust gas in front of adjusting device 25 is again detected or preferably specifically changed. In following seventh functional block 86, transit time LZ having subsequently appeared is ascertained. Second query 87 establishes whether the new transit time LZ ascertained in seventh functional block 86 deviates from transit time threshold value Lim or exceeds it. If this is the case, second query 87 outputs fault signal 76. If this is not the case, the diagnosis is ended with a "good" result, and, if indicated, the system branches back to start 70.

What is claimed is:

1. A method for operating an internal combustion engine, in which a diagnosis is performed of an adjusting device situated in an exhaust duct of the internal combustion engine, which distributes exhaust gas between a first exhaust-gas path and at least one second exhaust-gas path, the method comprising:

comparing a transit time from a change of a characteristic quantity of the exhaust gas in front of the adjusting device until an appearance behind the adjusting device detected by a sensor to a specified transit time threshold value, the transit time threshold value being established as a function of a setpoint position of the adjusting device;

providing a fault signal in the event of at least one of (a) a deviation from and (b) an exceedance of the threshold value; and detecting the change of the characteristic quantity in front of the adjusting device by a further sensor.

2. The method according to claim 1, further comprising specifying the change of the characteristic quantity of the exhaust gas by an intervention in an operation of the internal combustion engine.

3. The method according to claim 1, further comprising calculating the change of the characteristic quantity in front of the adjusting device.

4. The method according to claim 1, wherein the transit time threshold value is a function of a performance characteristic of the internal combustion engine.

5. The method according to claim 1, further comprising detecting, by the sensor, at least one of an air ratio lambda, a pollutant concentration, a temperature and a pressure as the characteristic quantity of the exhaust gas.

6. A method for operating an internal combustion engine, in which a diagnosis is performed of an adjusting device situated in an exhaust duct of the internal combustion engine, which distributes exhaust gas between a first exhaust-gas path and at least one second exhaust-gas path, the method comprising:
   comparing a transit time from a change of a characteristic quantity of the exhaust gas in front of the adjusting device until an appearance behind the adjusting device detected by a sensor to a specified transit time threshold value, the transit time threshold value being established as a function of a setpoint position of the adjusting device;
   providing a fault signal in the event of at least one of (a) a deviation from and (b) an exceedance of the threshold value;
   detecting the transit time following a change of the characteristic quantity of the exhaust gas at a first setpoint position of the adjusting device;
   storing the detected transit time as a transit time threshold value;
   subsequently detecting the transit time following a change of the characteristic quantity of the exhaust gas at a second setpoint position; and
   comparing the transit time detected in the second setpoint position to the stored transit time threshold value.

7. The method according to claim 6, further comprising undertaking a change of a position of the adjusting device from the first setpoint position to the second setpoint position in a stationary operating state of the internal combustion engine.

8. The method according to claim 6, further comprising specifying at least one of the setpoint positions.

9. A device for operating an internal combustion engine, in which a diagnosis is performed of an adjusting device situated in an exhaust duct of the internal combustion engine, which distributes exhaust gas between a first exhaust-gas path and at least one second exhaust-gas path, the device comprising:
   means for comparing a transit time from a change of a characteristic quantity of the exhaust gas in front of the adjusting device until an appearance behind the adjusting device detected by a sensor to a specified transit time threshold value, the transit time threshold value being established as a function of a setpoint position of the adjusting device;
   means for providing a fault signal in the event of at least one of (a) a deviation from and (b) an exceedance of the threshold value; and
   means for detecting the change of the characteristic quantity in front of the adjusting device, the means including a further sensor.

* * * * *